Patented June 6, 1944

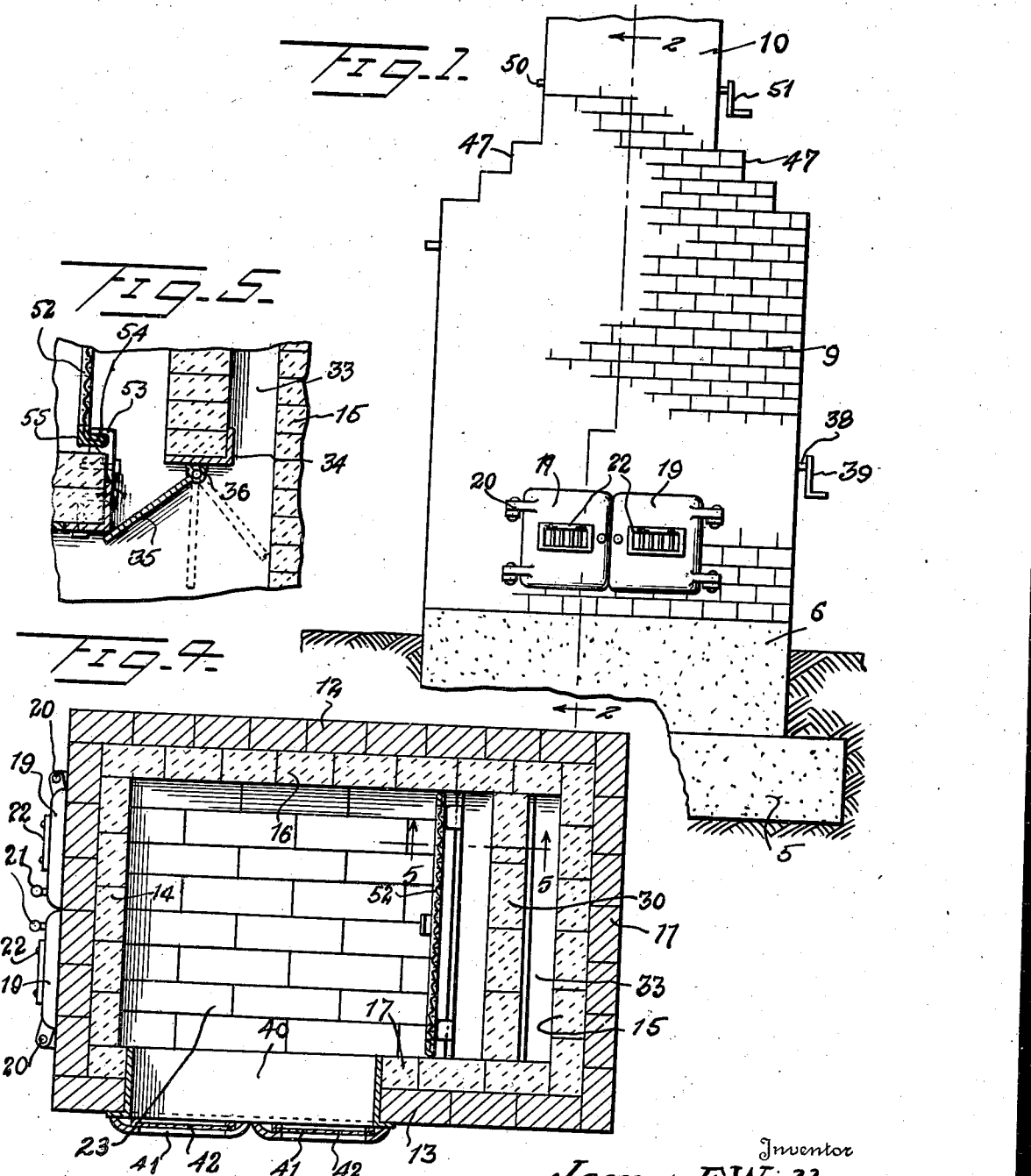

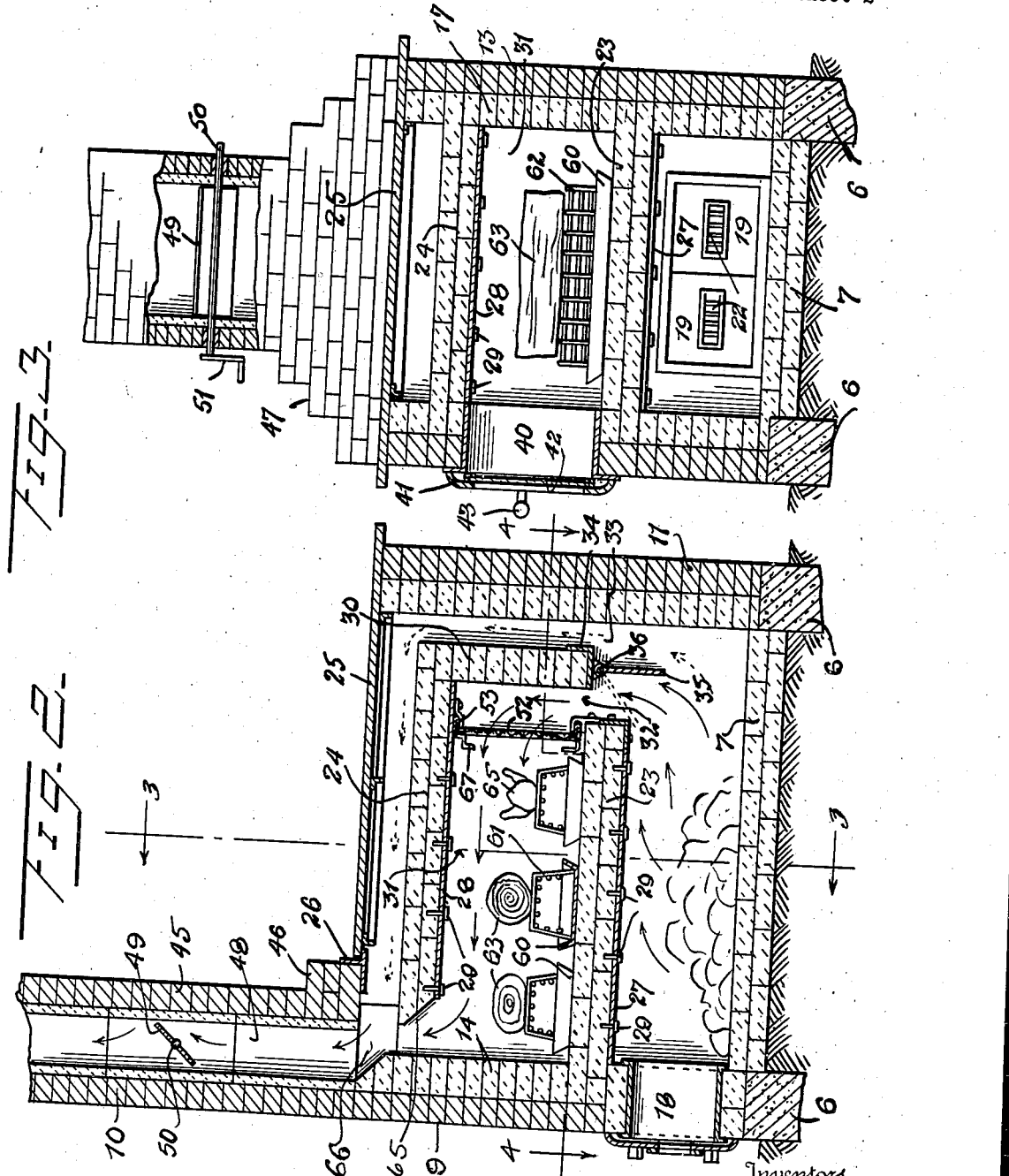

2,350,948

UNITED STATES PATENT OFFICE 2,350,948

OUTDOOR OR INDOOR BARBECUE OVEN

James E. Walker, Pensacola, Fla.

Application October 10, 1941, Serial No. 414,527

1 Claim. (Cl. 126—25)

The present invention relates to improvements in outdoor or indoor barbecue ovens.

The invention comprises an outdoor or indoor oven for barbecuing various meats and the like by either passing the hot gases directly over and in contact with the meats or causing the gases to travel around the oven compartment so that the heat from the gases may be directed under a hot plate and at the same time maintain a high temperature in the oven compartment.

The primary purpose of the invention is to provide a device of the above mentioned character which may be employed for barbecuing meat in such a manner as to prevent the juices from the meat from being lost, thereby reducing excessive meat shrinkage and to prevent the juices from falling on the fire and creating excessive flame.

A further object of the invention is to provide an outdoor or indoor barbecue oven which may easily and quickly be converted into a hot plate cooking stove so that food may be cooked in addition to the barbecue meat to complete a meal such as soup, coffee and other essentials to a well prepared meal.

A still further object of the invention is to provide a barbecue oven of the above-mentioned character in which a screen is provided in the oven to screen the incoming hot gases from the fire-box and prevent cinders and the like from being lodged on the meat or other food being barbecued on the racks or spits.

A still further object of the invention is to provide an outdoor or indoor barbecue oven which may be constructed of brick or the like and which comprises comparatively few parts to become disarranged after successive usage by different parties and which is substantially foolproof against explosions from excessive fat and greases commonly occuring in devices of this type.

A still further object of the invention is to provide an outdoor barbecue oven that can be constructed along side of building, with the roof of the building projecting out over top of the oven, giving easy access to the top for general cooking, with the oven door opening directly into the building so that the meat can be basted or otherwise attended without leaving the building.

Other objects and advantages of the invention will become apparent during the course of the following description of the accompanying drawings, wherein Figure 1 is a front elevational view of the barbecue oven, showing the position of the damper control crank and illustrating the location of the fire door;

Figure 2 is a vertical cross-sectional view taken on line 2—2 of Figure 1, looking in the direction of the arrows, illustrating in detail the location of the oven compartment and showing the manner in which the control damper may be arranged for directing hot gases through the oven chamber and beneath the hot plate;

Figure 3 is a vertical cross-sectional view taken on line 3—3 of Figure 2, looking in the direction of the arrows, illustrating the manner in which the operator may gain access to the oven chamber and further showing the heat compartment under the hot plate stove top;

Figure 4 is a horizontal cross-sectional view taken on line 4—4 of Figure 2, looking in the direction of the arrows, illustrating the removable screen in one end of the oven chamber and showing in detail the construction of the gas passageways; and Figure 5 is an enlarged fragmentary detail view of the control damper for directing hot gases either through the oven or beneath the hot plate or both.

In the drawings, wherein for the purpose of illustrating the invention and wherein like reference characters will be employed to designate the like parts throughout the same, the reference character 5 will generally be designated to represent a foundation base formed of concrete or the like having a foundation 6 superposed thereabove. The foundation is embedded in the earth or ground upon which the barbecue oven is supported. The foundation 6 provides a rectangular structure the space within which is filled with refractory brick 7 to provide a floor for the barbecue oven or a hearth for supporting a firebed thereabove.

The barbecue oven comprises a front wall 9 formed of brick or the like which extends upwardly and is decreased in width to provide one wall of a smokestack or flue 10. A rear wall 11 is mounted in opposed relation to the front wall 9 and said front and rear walls are connected by side walls 12 and 13 also formed of brick or firepoor material.

The front and end walls are lined with refractory brick 14 and 15 and the side walls 12 and 13 are similarly lined with refractory brick 16 and 17 respectively.

A metal door frame 18 is mounted in the floor portion of the front wall 9 and is provided with a pair of hinged closures or fire doors 19 hinged thereto as at 20. Suitable handles 21 are provided on the doors and draft cover plates 22 are carried by each door for allowing the passage of air through the door to be controlled in the usual manner.

Mounted above the hearth 7 is a partition 23 formed of refractory fire brick and said partition terminates a distance from the rear wall refractory brick lining 15, a sufficient distance, as illustrated clearly in Figures 2 and 4 to provide a vertical passageway.

Adjacent the upper portion of the barbecue oven there is provided a similar partition 24 connecting the side walls 16 and 17 and terminating at each end short of the front wall lining 14 and rear wall refractory lining 15. Above the partition 24, there is provided a stationary or a removable hot plate cooking top 25 formed of metal and resting upon the top edges of the side walls and rear wall 12, 13 and 11 and the rear edge of the hot plate 25 is supported by channel iron 26 extending across the side walls 12 and 13.

The underside of the partitions 23 and 24 are protected by metal sheathing 27 and 28 respectively secured in place by anchor bolts 29 or other anchoring means. Depending from the horizontal partition 24 and connecting the side walls 16 and 17 is a vertical partition 30 which has its lower end terminating between the rear end of the partition 23 and the rear wall 15 so that heat from the fire bed 8 may pass upwardly through the oven chamber 31 by way of a passage 32 or may pass upwardly through the passageway 33 to heat the space between the partition 24 and the top plate 25.

The nose of the downwardly depending partition 30 is provided with a channel iron 34 to which is hinged a damper 35, as at 36, so that the damper 35 may be swung to the dotted line position illustrated in Figure 2 whereby the heat from the gases will travel upwardly through the passageway 33 and heat the hot plate 25. The damper 35 may be swung to its reverse extreme position entirely closing passageway 33 so that all the hot gases will travel through the oven chamber 31. A shaft 38 is connected to the damper 35 and is provided with a hand crank 39 for the purpose of turning the damper from a position outside of the barbecue oven. Means may be provided for holding the crank 39 in one of its three positions.

Access may be had to the oven compartment 31 through an opening having a door frame 40 mounted in the side walls 13 and 17 and hinged to the frame 40 is a pair of solid doors 41 or doors having transparent panels 42, if desired, so that vision into the oven compartment may be had, while the meat or the like is being barbecued. Handles 43 are provided on the doors 41 for controlling the same.

The flue 10 is provided with a rear wall 45 which is supported on a series of base bricks 46 resting on the channel iron 26 and the flue 10 extends upwardly from stepped side walls 47 as clearly shown in Figure 1. Refractory lining 48 is provided in the stack and a damper 49 is pivotally mounted in the flue and is attached to a rod 50 which extends through the flue and is provide with a hand crank 51 at one end thereof.

Mounted in the rear end of the oven chamber 31 is a removable screen 52 held in place by clamping brackets 53 engaging the flanged edge 54 of the screen frame 55. The screen 52 bridges the opening entering the oven chamber through the passageway 32 so that foreign matter, such as cinders and the like, will engage the screen and fall downwardly through the opening 32 into the ash pit or hearth 7.

Mounted above the partition 23 is a series of trays 60 having racks 61 formed of wire portions connected by cross wires 62 for supporting various meat to be barbecued, as at 63.

During the barbecuing of meats or the like the fat and grease therefrom will fall into the tray 60 and will be prevented from finding its way to the fire chamber 8 by the partition 23.

The nose of the forward end of the partition 24 is slightly bevelled, as at 65, to conduct heat and gases to the flue 10 through a throat portion 66 formed at the base thereof.

The screen 52 may be removed by means of a handle 67 through the doorway 40 for the purpose of cleaning or replacing.

It is to be understood that the form of the invention herewith shown and described is to be taken as the preferred embodiment of the same, and that various changes in the shape, size, and arrangement of parts may be resorted to without departing from the spirit and scope of the invention as claimed.

I claim:

A barbecue oven comprising front, rear and side walls having refractory brick linings, a hearth forming the floor of the oven, a metal top wall for the oven, a flue located at the front end of the oven, a horizontal partition mounted above the hearth and terminating at a point adjacent the rear wall of the oven, a second horizontal partition located beneath the top wall of the oven and terminating at points adjacent the front and rear walls of the oven, a depending partition carried by the rear edge of the upper partition and terminating at its lower end a short distance rearwardly of the rear end of the lower partition to form an oven chamber and a hot gas inlet, the upper partition being so arranged within the oven as to provide a hot gas passage between the upper partition and metal top wall of the oven, a screen located at the hot gas inlet for preventing cinders from passing through the oven chamber and a damper plate carried by the lower edge of the depending partition for controlling the passage of hot gases through the inlet and over the upper partition adjacent the metal top wall.

JAMES E. WALKER.